United States Patent [19]
Kleinhans

[11] Patent Number: 6,047,597
[45] Date of Patent: Apr. 11, 2000

[54] DEVICE FOR FINDING THE FLOW RATE OF A FLOWING MEDIUM

[75] Inventor: Josef Kleinhans, Vaihingen, Germany

[73] Assignee: Robert Bosch GmbH, Stuttgart, Germany

[21] Appl. No.: 09/066,380

[22] PCT Filed: Jul. 24, 1996

[86] PCT No.: PCT/DE96/01355

§ 371 Date: Apr. 29, 1998

§ 102(e) Date: Apr. 29, 1998

[87] PCT Pub. No.: WO97/18444

PCT Pub. Date: May 22, 1997

[30] Foreign Application Priority Data

Nov. 11, 1995 [DE] Germany .......................... 195 42 143

[51] Int. Cl.[7] .................................................. G01F 1/68
[52] U.S. Cl. ................................... 73/204.15; 73/204.23
[58] Field of Search .......................... 73/204.15, 204.16, 73/204.18, 204.23, 204.25, 204.26

[56] References Cited

U.S. PATENT DOCUMENTS 4,196,382  4/1980  Bryzek .................................. 323/75 A
4,836,027  6/1989  Hannappel et al. ...................... 73/708
5,369,994  12/1994 Hecht et al. ......................... 73/204.16

FOREIGN PATENT DOCUMENTS 43 24 040   7/1993   Germany .

*Primary Examiner*—Harshad Patel
*Attorney, Agent, or Firm*—Michael J. Striker

[57] ABSTRACT

A device for determining the throughput of a flowing medium is described, wherein a heater resistor heats at least one upstream and downstream located, temperature-dependent resistor, wherein the resistors, which are cooled at different rates by the flowing medium, are wired to form a bridge, whose diagonal voltage is a function of the temperature difference of the resistors. In the end the mass of the flowing medium is determined from this processed voltage (UM). The control of the temperature of the resistor is performed with the aid of its own heater control circuit which regulates the current through the heater resistor in such a way that the temperature of the heater resistor is a predeterminable function of the temperature of the flowing medium. A temperature compensation, with the aid of which the measuring voltage (UM) is compensated at high temperatures, is performed with the aid of a high temperature compensation stage (DT) and of a converter circuit (UMS).

7 Claims, 1 Drawing Sheet

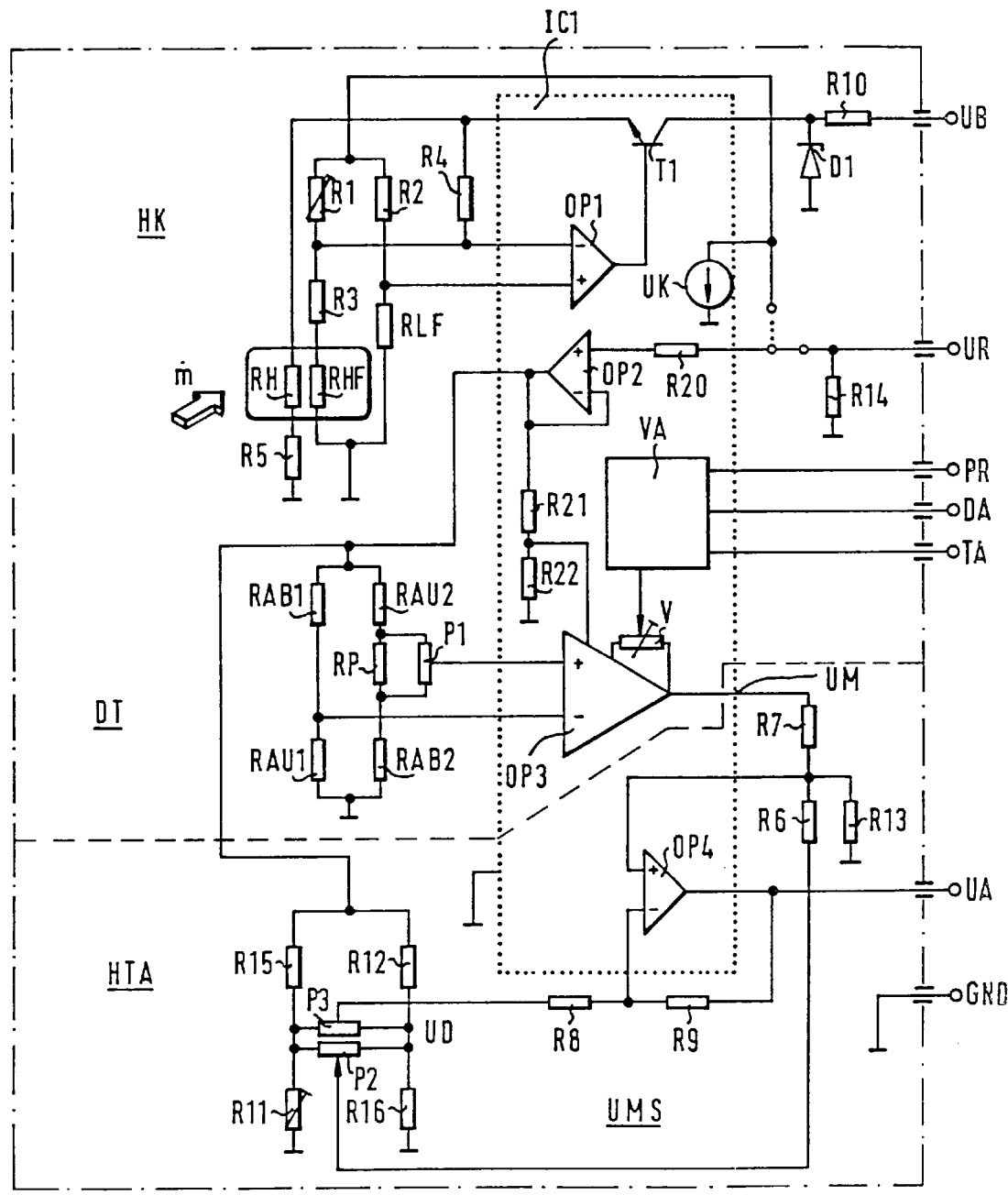

DEVICE FOR FINDING THE FLOW RATE OF A FLOWING MEDIUM

PRIOR ART

The invention is based on a device for determining the throughput of a flowing medium, for example the aspirated amount of air of an internal combustion engine, in accordance with the species of the main claim.

Sensors, as well as associated evaluation circuits, by means of which the throughput of a flowing medium can be determined, are known from DE-OS 43 24 040, for example. With these known mass flow sensors the sensor element is exposed to the flowing medium, for example the air flow. Here the sensor element comprises a heater, which is brought to an high temperature in relation to the medium to be detected by the application of a controlled current. A heater temperature sensor, as well as a temperature sensor, which detects the temperature of the flowing medium, are associated with this heater. Two temperature-dependent resistors are located in the spatial vicinity which, in respect to the flow direction of the medium to be detected, are placed laterally to the heated resistor, so that they are evenly heated by the latter. But they are cooled at different rates by the flowing medium, since the resistor reached first by the flow is cooled more than the other. The temperature difference resulting from this provides a measured voltage at a diagonal of the bridge of the proposed bridge circuit. The mass of the flowing medium is determined as a function of this measured voltage.

A device for determining the throughput of a flowing medium is described, wherein a heater resistor heats at least one upstream and downstream located, temperature-dependent resistor, wherein the resistors, which are cooled at different rates by the flowing medium, are wired to form a bridge, whose diagonal voltage is a function of the temperature difference of the resistors. In the end the mass of the flowing medium is determined from this processed voltage (UM). The control of the temperature of the resistor is performed with the aid of its own heater control circuit which regulates the current through the heater resistor in such a way that the temperature of the heater resistor is a predeterminable function of the temperature of the flowing medium. A temperature compensation, with the aid of which the measuring voltage (UM) is compensated at high temperatures, is performed with the aid of a high temperature compensation stage (DT) and of a converter circuit (UMS).

ADVANTAGES OF THE INVENTION

The device in accordance with the invention for determining the throughput of a flowing medium with the characteristics of the main claim has the advantage in comparison with the known device that a further improvement of the temperature behavior is achieved. This applies in particular to the high temperature behavior of the claimed device. This advantage is obtained in that the known circuit arrangement is complemented by an additional resistor bridge circuit, wherein this additional resistor bridge circuit permits high temperature compensation.

Further advantages of the invention are obtained by the steps recited in the dependent claims.

DRAWINGS

An exemplary embodiment of the invention is represented in the drawings and will be explained in more detail in what follows. The single drawing figure here shows the entire circuitry of the device in accordance with the invention with a heater control circuit and a so-called Delta T bridge circuit, such as is known at least in part from DE-OS 43 42 040. In addition, the circuit in accordance with the drawing figure also contains the additional high temperature compensation stage.

DESCRIPTION OF THE EXEMPLARY EMBODIMENT

A device in accordance with the invention for determining the throughput of a flowing medium is represented in the drawing figure, wherein the entire arrangement is placed on a substrate and is exposed in a suitable manner to the medium to be detected, for example the airflow in an aspirating tube of an internal combustion engine.

The heater control circuit HK comprises a bridge circuit with the resistors R1, R2, R3, RHF and RLF, wherein RHF is the heater temperature sensor and RLF the air, or respectively medium temperature sensor, and the value of these resistors is a function of the temperature. The resistor bridge of the heat control circuit HK is located between a voltage UK and ground.

Heating takes place with the aid of a heat resistor RH, which is connected to the battery voltage UB via the collector-emitter path of a transistor Ti and a resistor R10, wherein a Zener diode is additionally switched between the resistor R10 and ground for compensation of the voltage. The other side of the heater resistor RH is connected with ground via a resistor R5.

The second diagonal of the bridge circuit of the heater control circuit is connected with the two inputs of an operational amplifier OP1, whose output leads to the base of the transistor T1. Another resistor R4 is located between the inverting input of the operational amplifier OP1 and the heater resistor RH, or respectively the emitter of the transistor T1.

The actual measuring circuit is a resistor bridge circuit with the resistors RAB1, RAB2, RAU1, RAU2 and RP, designated as a temperature difference bridge (Delta T bridge circuit) DT. These resistors are temperature-dependent resistors which, the same as the heat resistor RH and the heater temperature sensor RHF, are at a high temperature compared with the temperature of the medium. Here, the resistors RAB1 and RAB2 are arranged downstream of the heater resistor, but the resistors RAU 1 and RAU2 upstream thereof, in relation to the flow direction of the medium to be detected.

The resistor bridge of the Delta T circuit DT is connected by one diagonal with the output of an operational amplifier OP2, whose non-inverting input is supplied with a reference voltage UR via a resistor R20, another resistor R14 is located between the resistor R20 and ground. The other side of the bridge diagonal mentioned is also connected with ground.

The voltage occurring at the other bridge diagonal is coupled out with the aid of a potentiometer P1, which lies parallel with the resistor RP. The wiper connector of the potentiometer P1 leads to the non-inverting input of an amplifier OP3, whose inverting input is connected with the connection point between the resistors RAB1 and RAU1. The amplifier OP3 is an amplifier with adjustable amplification. Digital voltage compensation is performed with the aid of the circuitry block VA, which has three connectors PR, DA, TA, through which the required triggering signals are supplied by an external evaluation device.

Incidentally, the amplifier OP3 is further connected via a voltage divider R21, R22 with the output as well as the inverting input of the operational amplifier OP2. The output of the amplifier OP3, where the measuring voltage UM can be picked up, leads to a resistor combination R7, R6, R13, which is a component of the converter circuit UMS, which is still to be described.

Besides the already mentioned resistors, the converter circuit UMS comprises an operational amplifier OP4, whose non-inverting input is connected with the connecting point between the resistors R6, R7, R13, and whose output is connected via a resistor R9 with the inverting input. The output voltage UA is generated at the output of the operational amplifier OP4, which is employed for determining the mass of the flowing medium, with the aid of the converter circuit UMS, which leads to the high temperature compensation stage HTA via the resistor R8, the voltage UM, which is provided by the measuring bridge, is superimposed on the compensation voltage generated in the compensation stage. The high temperature compensation stage HTA comprises the resistors R11, R12 as well as the temperature-dependent resistors R15, R16, which are wired as a bridge, and on the one hand are connected with the output of the operational amplifier OP2 as well as the respective connection of the DT bridge, while the other side of the bridge is connected to ground.

Two potentiometers P2, P3 are located in the other bridge diagonal, wherein one potentiometer connection is fixed and the other adjustable. The fixed connector of the potentiometer P3 leads via the resistor R8 to the converter circuit UMS. The variable wiper connector of the potentiometer P2 leads via the resistors R6, R7 of the converter circuit UMS to the output of the operational amplifier OP3, to which the measuring voltage UM is applied.

Of the total arrangement represented in the drawing figure, the high temperature compensation stage HTA and the converter circuit are the most important components of the instant invention, while the heater control circuit HK and the DT bridge are essentially already known from DE-OS 43 24 040.

To describe the mode of operation of the entire device, first the mode of functioning of the heater control circuit HK and of the DT bridge will be discussed, thereafter the mode of functioning of the HTA compensation stage and the converter circuit UMS will be described.

The resistor RH, i.e. the heater resistor, the resistor RHF, which is intended to detect the temperature of the heater resistor, and the resistors RAU and RAB which, in the exemplary embodiment are designed as separate resistors RAU1, RAU2, RAB1, RAB2, are arranged on the substrate, for example a diaphragm. In this case the heater resistor RH is completely surrounded by the resistor RHF, the resistors RAU and RAB, or respectively RAU1, RAU2 and RAB1, RAB2 are respectively disposed laterally of the resistor RH and RHF. The flow of the medium, which is indicated in the drawing figure by an arrow as well as the identification m, occurs in such a way, that the flow first flows over the resistor RAU, or respectively RAU1, RAU2, and then over the resistor RH and thereafter over the resistor RAB, or respectively RAB1, RAB2. By means of this the resistor RAU is cooled more than the resistor RAB. The difference in cooling is evaluated for determining the flowing medium.

The resistor RHF, which measures the temperature of the substrate, or respectively the diaphragm, in the vicinity of the heater resistor RH is arranged in a bridge circuit, as represented in the drawing figure. The bridge arm in which the resistor RHF is arranged is connected with the inverting input of the operational amplifier OP1. The output voltage of the operational amplifier OP1 acts on the base of the transistor T1 in such a way, that a feedback to the heater resistor RH takes place in such a way that heating of the resistor RHF leads to a reduction of the current flow to the resistor RH.

The resistor RLF, whose resistance is a function of the air temperature, is arranged in the other bridge arm. Since this resistor arm acts on the non-inverting input of the operational amplifier OP1, the flow conduction is generally increased by the heater resistor RH with increasing temperature of the air, or respectively the flowing medium. The two bridge arms therefore act in such a way on the heater resistor, that a defined high temperature in comparison with the air temperature is set, i.e. a defined temperature difference between the air temperature and the heater temperature.

An additional temperature dependence of the high temperature can be generated by a suitable selection of the resistors R1 and R3, which are also arranged in the bridge arm which retroacts on the inverting operational amplifier input. In this case the high temperature of the heater resistor RH in comparison with the air temperature is not constant, but is a function of the air temperature. The resistors R1 and R3 should be designed a platinum resistors, for example, whose resistance changes as a result of the air, or respectively medium, temperature. This additional dependence of the temperature of the heater resistor on the ambient temperature can be used for compensating for secondary effects, such as the temperature dependence of the heat conducting ability, the density or similar effects. In this way it is possible by an appropriate selection of the resistor values of the resistors R1, R3, RHF to achieve a particularly linear output characteristic curve of the sensor. The two resistors RAU (upward) and RAB (downward), or respectively the arrangement RAU1, RAU2 and RAB1, RAB2 represented in the drawing figure, are provided for evaluating the mass flow. If no flow moves along the top of the substrate, the resistors RAB and RAU are evenly heated by the heater resistor RH. With a flow on the top of the substrate, the upward located resistor, or respectively the upward located resistors RAU1, RAU2, are cooled more strongly than the downward located resistors RAB or respectively RAB1, RAB2. It is even possible that the temperature of the downward located resistor RAB is increased by a flow, since the flow transports heat from the heater resistor RH to the downward located resistor.

The resistors RAU1 and RAB1 as well as RAU2 and RAB2 are arranged in a bridge circuit, which is compensated with the aid of the resistor RP as well as the parallel connected potentiometer P1, which is triggered by the operational amplifier OP3. Optimal compensation is possible, because the resistance behavior of the potentiometer P1 can be changed at any time and from the outside by an external action on the operational amplifier P3. The amplifier OP3 is influenced via a compensation stage VA, by means of which a digital amplifier compensation can be performed. To this end, signals are supplied to the compensation stage VA via the inputs PR (program) and DA (data), clock signals reach VA via TA.

The high temperature compensation stage HTA is introduced for the further improvement of the properties of the circuit arrangement so far described. The resistor bridge circuit with the resistors R11, R12, R15, R16, of which the resistors R15, R16 have the same temperature dependence, for example, is the main component for temperature compensation. At room temperature the resistor ratio of R11/R15 is equal to R12/R16 should apply. Therefore the diagonal voltage of the bridge at room temperature equals zero millivolt.

Because of the temperature dependency of the resistors R15 and R16, a diagonal voltage UD is generated at other temperatures, which is not equal to zero and is proportional to the temperature.

The two potentiometers P2 and P3 of the high temperature compensation stage HTA are arranged in the transverse arm of the resistor bridge. P3 here is fixedly set to the center position, i.e. the potentiometer resistance to the left and the right of the wiper is identical.

The wiper position at the potentiometer P2 is variable. It is possible by means of this potentiometer P2 to set the proportion needed for the compensation of the temperature error. This setting is provided starting with the output voltage UM at the operational amplifier P3. With optimal decoupling from the resistors R8 and R6 it is possible to create a voltage which is a function of the temperature, wherein the compensation at high temperatures does not affect the compensation at room temperature if, as already mentioned:

R11/R15=R12/R16 applies with the condition that room temperature prevails. Incidentally, the uncoupling from the resistors can be realized in that high-impedance resistors R8, R6 are employed, or a voltage sequencer circuit is employed.

It is possible by means of the high temperature compensation stage to keep the effect of the media temperature on the measured result low, particularly in connection with a low flow. It is not necessary here that the temperature be constant during the high temperature compensation, it is merely required that a sufficient temperature increase in comparison with the room temperature is provided. The circuit arrangement represented in the drawing figure, in particular in the area of the heater control circuit HK or the temperature difference bridge DT, has been provided by way of example, other, similarly acting circuit arrangements are possible. As already mentioned, it is possible, for example, to combine the resistors RAB1 and RAB2, as well as the resistors RAU1 and RAU2 in respectively one resistor. It is furthermore possible to connect compensation resistors in series in addition to the heater temperature sensor RHF, wherein the former can be respectively located upstream and downstream of the bridge arm.

For example, the resistor RP can be omitted in the DT bridge circuit and only one potentiometer P1 can be replaced. The portion of the entire installation identified by IC1 is a hybrid circuit, for example, which includes a plurality of operational amplifiers, current sources and transistors, as well as a number of hybrid resistors with selectable temperature coefficients.

The entire arrangement represented in the drawing figure can be integrated in a chip with connections, at which the following values are supplied, or respectively picked up:

UB: Battery voltage
UR: Reference voltage
PR: Program for amplification control
DA: Data input
TA: Clock frequency
UA: Output voltage
GND: Ground connection

I claim:

1. A device for determining the throughput of a flowing medium, having a substrate, which can be exposed to the flowing medium, on which a first resistor arrangement (R1, R2, R3, R5, RH, RHF), which is a component of a heat control circuit, is arranged, with at least one resistor RH, which is heatable to a predeterminable temperature, and a second resistor arrangement (RAB1, RAB2, RAU1, RAU2), which is wired as a bridge, whose one diagonal is located between a supply voltage and ground and includes at least two temperature-dependent resistors (RAB1, 2, RAU1, 2) which, in relation to the flow direction of the flowing medium to be detected, are arranged above and below the heater resistor (RH), so that they are evenly heated by it, while they are being cooled at different rates by the flowing medium, and the measuring voltage (UM) which occurs as a result of the temperature difference is evaluated at the other bridge diagonal for determining the throughput, characterized in that a third resistor arrangement (HTA) is provided, which comprises resistors (R11, R12,) temperature-dependent resistors (R15, R16) in a bridge circuit and at least two potentiometers (P2, P3), which are located in the transverse arm of the bridge, and which detects a diagonal voltage, which is a function of the temperature and is superimposed by the measuring voltage.

2. The device in accordance with claim 1, characterized in that one of the potentiometers of the third resistor arrangement is fixedly set and the other is variable.

3. The device in accordance with claim 2, characterized in that the potentiometer which can be set to be variable is adjustable as a function of the measuring voltage (UM), wherein the setting of the resistance ratio of the potentiometer takes place as a function of the output signal of the operational amplifier (OP3), which the measuring voltage (UM).

4. The device in accordance with claim 2, characterized in that the setting of the potentiometer is provided in such a way that an optimal compensation of the temperature error takes place at higher temperatures.

5. The device in accordance with claim 1, characterized in that the diagonal voltage (UD) of the third resistor arrangement and the measuring voltage (UM) are superimposed in a converter circuit (UMS) for generating the temperature-compensated output signal (UA).

6. The device in accordance with claim 1, characterized in that the resistors of the third resistor arrangement (HTA) have been selected such that a room temperature R11/R15= R12/R16 applies.

7. The device in accordance with claim 1, characterized in that the resistors (R6 and R8) are high impedance ones or that the operational amplifier (OP4) is wired as a voltage sequencer.

* * * * *